F. ROSENSTEIN.
FILTER.
APPLICATION FILED OCT. 3, 1906.
899,075.
Patented Sept. 22, 1908.
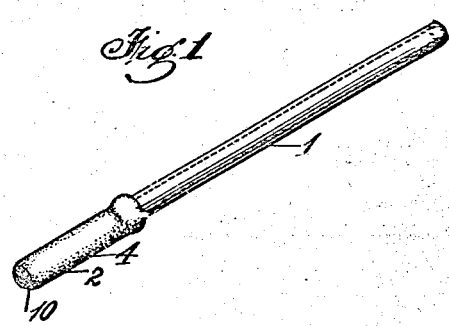
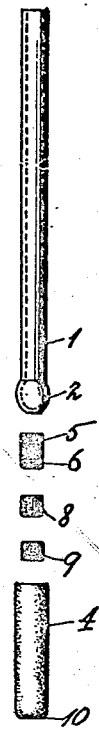
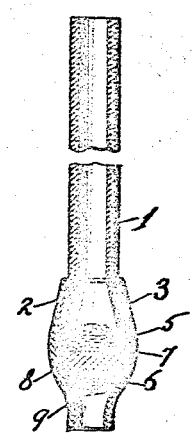
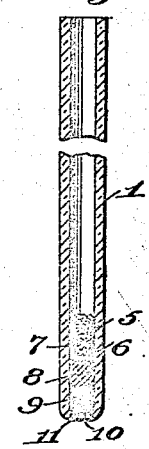
Witnesses
Inventor
Fritz Rosenstein

UNITED STATES PATENT OFFICE.

FRITZ ROSENSTEIN, OF LOS ANGELES, CALIFORNIA.

FILTER.

No. 899,075.

Specification of Letters Patent.

Patented Sept. 22, 1908.

Application filed October 3, 1906. Serial No. 337,985.

*To all whom it may concern:*

Be it known that I, FRITZ ROSENSTEIN, citizen of the United States, residing at Los Angeles, in the county of Los Angeles and State of California, have invented new and useful Improvements in Filters, of which the following is a specification.

This invention relates to improvements in filters and has particular reference to portable filters, adapted to be carried about in vest or other pockets.

One of the objects of this invention is to provide a light, convenient and portable filter, that can be used for all purposes, of a drinking vessel, and which, at the same time cleanses the fluids to be imbibed therethrough of all dangerous germs, which are prevalent in liquids and drinking receptacles commonly found in public places.

The invention is illustrated in the accompanying drawing:

Figure 1 is a perspective view. Fig. 2 a vertical section. Fig. 3 a segregated view. Fig. 4 a vertical section of a modified form, and Fig. 5 is a vertical section of another modified form.

Specific reference being had to the drawing, 1 represents a tubular body consisting of transparent or vitreous material, the lower extremity of the body being provided with a bulging portion 2, seen in Fig. 2, or with a tapering end 3 as seen in Fig. 4.

4 designates an elastic body arranged to snugly and tightly engage said bulging portion 2, or said tapering end 3. Within said elastic body is a cage 5, composed of two parts 5 and 6 and adapted to form a container for a fibrous filter medium 7.

8 is a filter stone, located below said filter cage and 9 is a sieve or strainer fitting the lower end of said elastic portion 4. The extremity 10 of said elastic portion 4 is convergent for the purpose of forming a hold or tight fitting sleeve for the component parts of the filter container.

The filter cage shown in Fig. 4, is spherical in shape, when serving as a container, and consists of two hemispherical portions having interposed the filter stone 8.

The construction of the filter as shown in Fig. 5, is preferable, since the cost of manufacture of a filter of this type, is considerably less and the filter media, together with all the parts thereof, can be easily wedged into the extremity through the wider opening of the tube. In said figure, the opening at the extremity is constricted as seen at 11, to form a seat for the filter medium.

What I claim and desire to secure by Letters Patent of the United States, is:

1. A portable filter comprising a hollow body having a bulging extremity, an elastic body fitting said bulging extremity, a foraminous cage in said elastic body, a stone beneath said cage, and a sieve in the end of said elastic body.

2. A portable filter comprising a hollow transparent body, having a bulging extremity, a nipple removably fitting said extremity, a cage in said nipple and a filter medium in said cage.

3. A portable filter, comprising a transparent hollow tube having a distended end, a flexible nipple removably fitting said distended end, a filter medium in said nipple, and a screen inclosing said filter medium.

4. A portable filter comprising a hollow transparent body having at one end a distention and a constricted opening in said distention, a flexible nipple fitting said distention, a fibrous filter in said nipple, a stone beneath said fibrous filter, and a cage inclosing said fibrous filter and stone, said cage being within said nipple.

5. A portable filter comprising a hollow transparent body having at one end a distention and a constricted opening in said distention, and an elastic body fitting said distention, a two-part foraminous cage in said elastic body, a filter medium in said cage, and a stone beneath said filter medium.

In testimony whereof I affix my signature, in presence of two subscribing witnesses.

FRITZ ROSENSTEIN.

Witnesses:
E. M. THOMPSON,
ISIDOR STEINHARDT.